United States Patent Office 3,036,630
Patented May 29, 1962

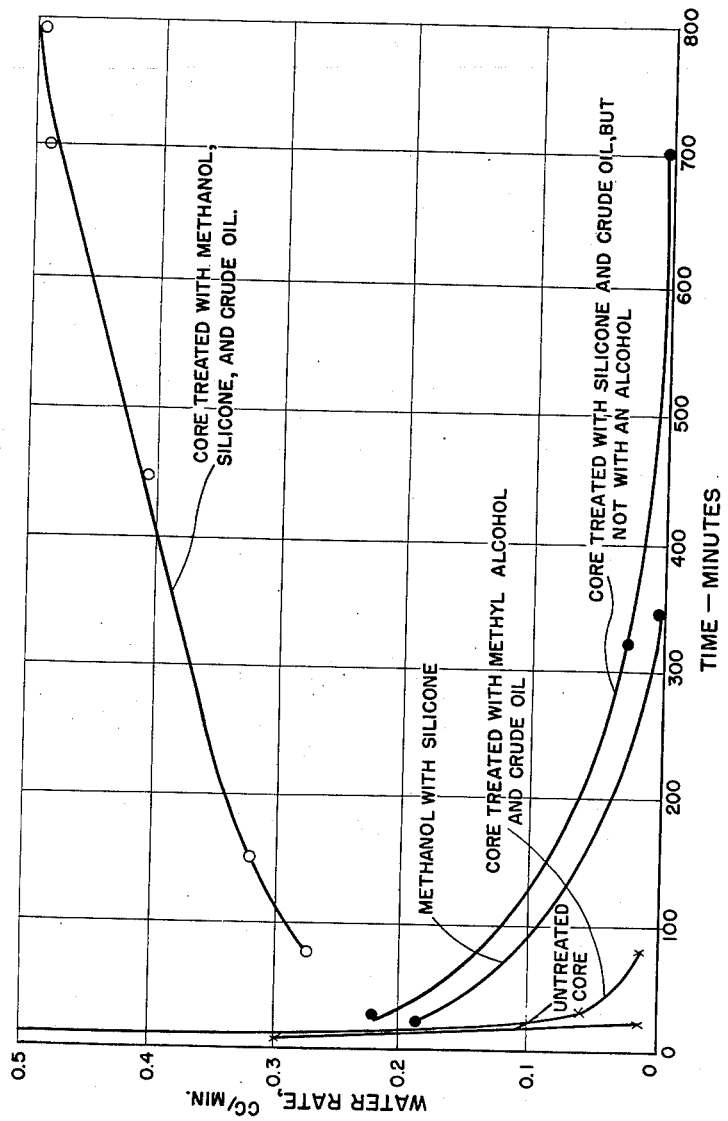

3,036,630
WATER-FLOOD PROCESS FOR CLAY-CONTAINING FORMATION
George G. Bernard and Orrin C. Holbrook, Crystal Lake, Ill., assignors to The Pure Oil Company, Chicago, Ill., a corporation of Ohio
Continuation of application Ser. No. 697,741, Nov. 20, 1957. This application Jan. 9, 1961, Ser. No. 81,633
5 Claims. (Cl. 166—9)

This invention relates to reducing the swelling or dispersion of water-sensitive clay formations by contact with water-containing fluids. It is more specifically concerned with a secondary recovery process employed in recovering petroleum oils from partially depleted subterranean reservoirs wherein the efficiency of the displacement of petroleum oils from water-sensitive rock reservoirs by water flooding is improved.

In the contacting of formations which contain water-sensitive clayey constituents with fresh water, swelling of these constituents is prevented and the permeability of the rock reservoir thereby maintained by treating the formation sequentially to render the interstitial surfaces water-repellent and preferentially oil-wettable by coating the surfaces with a silicone water-repelling agent, and thereafter treating the water-repellent interstitial surfaces with a petroleum mineral oil prior to initiating the injection of fresh water.

The susceptibility of clay-containing formations to swelling, dispersion, etc., by contact with aqueous solutions is well known. Brown, et al., in U.S. Patent 2,761,842 comprehensively discuss the problem, the types of clays that are sensitive, and conditions which produce this problem. Treatment of clay-containing formations is especially applicable in the recovery of oil from subterranean geological formations, especially secondary recovery processes.

In the production of oil, expulsion of the fluid from subterranean reservoirs requires some kind of driving energy. Normally, flow from oil-containing reservoirs is induced by natural forces which are only sufficient to permit the recovery of a portion of the oil contained in the reservoir. It is frequently necessary in the successful exploitation of oil fields to employ various methods for prolonging the production life of the oil field after the natural expulsion forces have dissipated. Because of their effectiveness for removing adherent oil and capillary-held oil from rock reservoirs, water flooding processes have been extensively employed in secondary recovery operations employed in the recovery of residual oil from partially depleted subterranean reservoirs. In water flooding processes the water is introduced into the oil-bearing formation under pressure through an injection well. As the driving force slowly advances through the formation to the recovery well, it will displace the oil by functioning in a piston-like manner to produce the oil by a pushing action.

The permeability of the rock reservoir is also an important factor in flooding operations. In general, the permeability of the oil, sand, or rock, reservoir should be sufficient to permit the injection of water into the reservoir at an economic rate. In shallow sands this requires a high permeability so that a pressure parting of the formation is not produced at the injection pressures employed. In addition to the inherent permeability of the rock reservoir being flooded, the permeability of the formation can be affected by clay materials which are present as a formation constituent, either as natural constituents or through the medium of a clay-containing drilling mud. Bentonitic constituents, such as the illites and montmorillonites, are susceptible to dispersion by fresh water, and when dispersed by contact with fresh water, cause a substantial reduction in permeability. It is therefore necessary in the water flooding of clayey formations with fresh water that the clay material in the rock reservoir be kept in a permanently flocculated state if the rock permeability is to be retained. In the detection of bentonitic constituents in the formation, the gamma-ray log is a useful tool because the bentonite is not radioactive by itself. However, the fine silts that contain a high potassium content are associated with the bentonite and the gamma-ray intensity of bentonitic or organic material will exceed that in marine shales, and therefore can be detected easily.

It is therefore the primary object of this invention to provide a method for treating clayey, geological formations, which are sensitive to fresh water, in order to avoid a dispersion of the clayey constituents contacted by the fresh water. It is another object to reduce the water sensitivity of clayey geological formations from which residual oil is recovered by water flooding, secondary recovery operations. These and other objects will become more apparent from the following detailed description of this invention.

FIGURE 1 presents graphically a comparative review of manipulative techniques employed in the investigation of this invention.

According to this invention, the reduction in permeability caused by the dispersion of bentonitic clayey constituents in a rock reservoir by contacting the mineral surfaces with fresh water is prevented by a concatenation of steps involving the treatment of the interstitial surfaces with a silicone water-repellent and the subsequent contacting of the silicone-treating section with a petroleum mineral oil. Thereafter, contacting of the mineral surfaces with fresh water, as for example, in a water flooding process, can be carried out without causing the dispersion of the bentonitic or other water-sensitive clayey constituents. In employing the instant invention in secondary recovery operations, because the largest percentage of the pressure drop between the injection and producing wells in a water flooding operation occurs in the radial zone immediately adjacent the injection well bore, it is only necessary in carrying out the instant invention to treat that section having a radius of 5–15 feet from the injection well. In some instances it will only be necessary to treat the radial zone adjacent the injection well. It is preferred, however, in order to obtain maximum effectiveness, that both the injection and producing well radial zones be treated in accordance with this invention.

In the event it is necessary to remove the water from the interstitial surfaces prior to forming the silicone coating, it is preferred that a suitable solvent be introduced into the formation in order to substantially completely remove the water from the radial zone being treated. The solvent chosen is one in which water is highly soluble. Accordingly, the lower alcohols and ketones, such as methanol, ethanol, propanol, butanol, dimethyl ketone, diethyl ketone, methylethyl ketone, etc. can be used, as well as other dehydrating agents of this nature. In general, injecting about 50 gallons of solvent for every foot of formation depth to be treated is effective and adequate; however, more or less than this amount will be required if the pore volumes are greater or smaller than average. In other words, a volume of solvent equivalent to about 5–25 times the pore volume of the zone to be treated is usually sufficient.

Although not as expeditious as the use of a solvent-washing step to effect the removal of water from the rock reservoir surfaces, the same effect can also be produced by disposing within the well bore to be treated a heating device. Gas heaters, electrical heaters or other similar types of bore-hole heaters of this nature are well known in the prior art. In use, the heater is installed for sufficient time to effect the dehydration of the section of the formation being processed in accordance with this invention.

To produce a thin coating of a silicone water-proofing agent on the mineral surfaces in order to make the interstitial walls preferentially oil wettable, a variety of agents can be used in this step. The coating can either be produced by contacting the surfaces with a silicone polymer, per se, or by means of a silicone polymer-producing agent. The materials of the former class which are employed for this purpose are organosiloxanes, or silicones, which are comprehensively described and discussed by E. G. Rochow in the "Chemistry of the Silicones," Wiley & Sons, 1947. The alkyl, aryl, alkyl-aryl or alkoxy siloxanes, e.g., dimethyl siloxane polymers (J.A.C.S. 68, 2284 (1946)), etc., comprise the water-proofing agent employed in this step. In employing a slioxane, per se, it is preferred that the siloxane, dissolved in a non-aqueous fluid vehicle, such as hydrocarbon solvents including toluene, benzene, xylene, kerosene, naphthas, $CCl_4$, aromatic mixtures, paraffinic mixtures, etc., be used wherein the silicone is present in a concentration within the range of about 1–15%. The amount of silicone employed will be sufficient to render the treated formation zone preferentially oil wettable. The amount employed will depend upon the concentration of the silicone solution, the radial thickness of the zone being treated, and a number of other factors. In general, however, a volume of a solution having a concentration of silicone within the range of about 0.5–10%, equivalent to about 1–10 times the pore volume of the zone to be treated, will effect the imparting of oil wettability to the interstitial passageways of the formation.

The interstitial passageways can also be coated with a silicone by contacting the formation surfaces which have been previously dried, as hereinbefore discussed, with a silicone-forming agent, such as an alkyl- or aryl-substituted silicone halide. In employing the silicon halides as silicone-forming agents, the silicon halide is introduced into the section of the formation to be treated employing a solution of the silicon halide in a hydrocarbon solvent, chlorinated solvent, or other suitable solvent which contains about 0.5–5% by weight of the silicone-forming agents. Thereafter, the silicone-forming agent is hydrolyzed to form the silicone polymer by forcing a water-containing mixture into the formation. The coating of the clayey formation reservoir employing this technique is further described by Bond in U.S. Patent 2,469,354 and Bauer et al. in U.S. Patent 2,633,919.

It is to be noted that the dehydration processes outlined above, while removing substantially all of the water contained in the interstitial passages, do not effect the complete desiccation of the mineral surfaces. Generally this condition obtains with the application of more rigorous conditions such as concomitant heating and evacuation. Accordingly, the dehydrating step of this invention removes substantially all of the water, but leaves sufficient moisture to permit the use of the aforementioned hydrolyzable silicone halides without introducting any water into the interstitial passages.

In the event that it is undesirable to carry out the steps of dehydration, followed by the coating of the section of the formation to be treated with a silicone employing the hydrolysis of selected silicone halides, the clayey section of the formation can be rendered preferentially oil wettable by employing metal siliconates from siliconic acids, mono-organosilane triols, or their condensation products. For example, see U.S. Patent 2,507,200 to Elliott, et al. In forming the silicone polymer on the interstial passageways, a water-soluble metal salt of an organic siliconic acid, e.g., a 5% aqueous solution of sodium methyl siliconate is forced into the formation in the circumambient zone adjacent the injection well or producing well, and contacted with an acidic solution whereby a silicone polymer is precipitated to form an oil-wettable coating on the surfaces of said circumambient zone. This technique has been employed for facilitating the injection of water into a normally water-wettable, subterranean, oil-containing formation in a secondary recovery operation, and is described and claimed in U.S. patent application Serial No. 473,478, filed December 6, 1954, now Patent No. 2,846,012.

After the formation has been rendered preferentially oil-wettable by coating the interstitial passageways of the zone being treated with a silicone polymer, an amount of a petroleum mineral oil sufficient to completely wet the treated zone with the oil is injected into the section of the clay formation which is treated. Either crude oil or products derived from crude oil, such as kerosine, fuel oils and heavier lubricating oil fractions, can be employed in this step of the invention. Although any mineral oil can be used in this step, re-injection of a portion of the crude oil already produced from the formation during primary depletion is the most economical. The amount of oil introduced during this step is generally about equal to the volume of solvent employed, or, in other words, a volume of oil equivalent to about 5–25 times the pore volume of the zone to be treated. However, pore volumes greater or smaller than this can be employed depending on the exact formation conditions encountered.

If the subject invention is employed as a complementary step in a secondary recovery process after the oil has been injected, the fresh-water flood is initiated in a conventional manner and can be carried out without any deleterious effect on the permeability of formation due to a dispersion of the clayey constituents of the rock reservoir being treated. It has been found that by treating the radial zone immediately adjacent the injection well and/or producing wells employing the process of this invention, the clay materials in the rock reservoir are kept in a permanently flocculated state, and the permeability of the sand or rock reservoir is retained.

In order to demonstrate the effectiveness of the instant invention for preventing a decrease in the permeability of a bentonite clay-containing formation, a number of experiments were carried out in which the various steps employed in the instant invention were used in the pretreating process prior to the introduction and passing through of the fresh flooding water.

In these experiments, montmorillonite-containing cores were mounted in a conventional core-holder and subjected to selected treating techniques. In carrying out these investigaions, a plurality of treating systems were utilized. In each instance the respective steps were carried out in treating the core, and, after the completion of the treating steps, the permeability of the core to distilled water was determined employing a conventional permeameter apparatus in which distilled water was utilized as the flow medium. Equal pressure differentials were imposed across each of the cores used in the investigations during a final determination of permeability of the treated core to distilled water. The cores were 1 inch in diameter and 1 inch long. In order to insure substantially the uniformity in the core compositions, the cores were prepared synthetically. These cores were prepared by intimately admixing 80 parts of finely divided silica with 2 parts of clay and sufficient amount of a thermoplastic resin to bind the sand and clay into a firm mass. The mixture was then heated to a temperature of about 120° F. and subjected to a pressure sufficient to cause the resin to bind the sand and clay particles into a solid mass. The water-sensitive cores employed in this investigation contained 2% of clay in admixture with a sand having a mesh of 50–70. The specific permeability of these cores was 800 millidarcies. The manufacture of these synthetic cores is further described in U.S. patent application Serial No. 676,188, filed August 5, 1957, now abandoned.

The results of this investigation are tabularly summarized in Table I and the results are graphically presented in FIGURE 1:

Table I

| Method | Pore Volumes | Time, Minutes | Water Rate, cc./Minute |
|---|---|---|---|
| Untreated | | 10 | 0.26 |
| | | 20 | 0.14 |
| | | 30 | 0.01 |
| $CH_3OH$ | 10 | 10 | 0.2 |
| | | 30 | 0.05 |
| Crude Oil | 10 | 80 | 0.01 |
| Silicone [1] | 10 | 50 | 0.18 |
| Crude Oil | 10 | 200 | 0.07 |
| | | 400 | 0.02 |
| $CH_3OH$ | 10 | 700 | <0.01 |
| | | 50 | 0.15 |
| Silicone [1] | 10 | 100 | 0.09 |
| | | 200 | 0.04 |
| $CH_3OH$ | 10 | 350 | <0.01 |
| | | 100 | 0.29 |
| Silicone [1] | 10 | 300 | 0.37 |
| Crude Oil | 10 | 500 | 0.43 |
| | | 800 | 0.5 |

[1] Silicone coating of mineral surfaces of the core effected by passing 10 pore volumes of a 1% by vol. solution of methyl chlorosilane in toluene through the core which contained small amounts of adsorbed water with which the chlorosilane reacted in situ to form a very thin film of methyl polysiloxane on the interstitial surfaces.

From these data it is seen that when various systems are employed, the water rate, which is an indication of the effect of water on the water-sensitive clay-containing cores, depreciates or diminishes to the point where the water flow through the core is decreased to substantially zero. In contradistinction, when the water-proofing-crude-oil system which is the process of this invention is employed, the water rate increases with time. The graphical presentation of these data in FIGURE 1 clearly shows the ineffectiveness of the comparative systems and emphasizes the benefits which are derived from the instant invention.

The instant invention has specific application in conventional water flooding practices and is adaptable for use in a variety of flooding operations such as circular flood, line-flood, boundary flood or other types of flooding techniques. In applying the treating process of this invention, the conventional injection equipment utilized in the water flooding process can be employed. The respective treating agents can be forced into the injection well through a suitable-diameter tubing disposed in the well bore and equipped with packers. The tubing is preferably cemented in the cap-rock whereby the treating agents and subsequent flooding water are confined within the well bore to the interval in which the oil reservoir to be treated is penetrated. In the event that it is preferred to effect the initial dehydration of the rock reservoir by a heat-treatment technique, the heater can be disposed in the well bore adjacent the formation which is to be dehydrated in this manner. A variety of electrical or gas-fired burners are described in the prior art for effecting this production of necessary heat.

The flood water which is employed as the driving force in the water-flooding operation which is carried out subsequent to the treatment of the water-sensitive formation, which is the process of this invention, can be preconditioned to remove or mitigate the plugging effect of contained sediment or dissolvent substances which will form solid materials which will clog the pore spaces of the rock reservoir. Corrosion inhibitors can also be employed in properly conditioning the fresh flood-water which is injected into the process during the water-flooding process. In addition, it may also be desirable to employ surface-active chemicals for promoting the water flooding efficiency. A number of suitable surface-active compounds are described in the prior art for this purpose.

Although the foregoing invention has been specifically illustrated by use of a sequential treatment involving the dehydration of the reservoir to be treated by means of a solvent wash, followed by the coating of the interstitial surfaces with a silicone fluid and the coating of the surfaces with a crude oil in a water flooding process, it is evident that a number of modifications of this process can be employed as hereinbefore discussed. The instant invention also finds application in the treating of formations to improve the efficiency of other well-completion, or oil-producing processes. Such modifications and variations can be carried out by one skilled in the art without departing from the scope of this invention. It is, therefore, apparent that such modifications will be covered by the appended claims.

This application is a continuation of application Serial No. 697,741, filed November 20, 1957, now abandoned.

The embodiments of the invention in which an exclusive property or privilege is claimed are defined as follows:

1. A water-flooding process for the production from a producing well of petroleum oil from an underground formation containing water-sensitive clay comprising removing most of the water from the portion of the formation adjacent an injection well, by injecting a water-soluble solvent into said portion of the formation, then in sequence injecting into said portion of said formation through said well a silicone water-proofing agent, petroleum oil and a water-flooding fluid, and forcing said fluid into the producing formation toward said producing well.

2. A process according to claim 1 in which water is removed from said portion of the formation by the injection of methanol into said portion of the formation.

3. A process according to claim 2 in which said portion of the formation extends radially from said well a distance of from 5 to 15 feet.

4. A process according to claim 3 in which the silicone water-proofing agent is a solution of hydrolyzable silicone halide.

5. A method according to claim 4 in which the volume of methanol injected is about 5 to 25 times the pore volume of said portion of the formation.

References Cited in the file of this patent

UNITED STATES PATENTS

| | | |
|---|---|---|
| 2,469,354 | Bond | May 10, 1949 |
| 2,614,635 | Williams | Oct. 21, 1952 |
| 2,633,919 | Bauer | Apr. 7, 1953 |
| 2,816,610 | Fisher | Dec. 17, 1957 |
| 2,846,012 | Lorenz | Aug. 5, 1958 |